W. E. MAYNARD.
HUMIDITY REGULATOR FOR INCUBATING APPARATUS.
APPLICATION FILED JUNE 8, 1911.
1,009,430.
Patented Nov. 21, 1911.
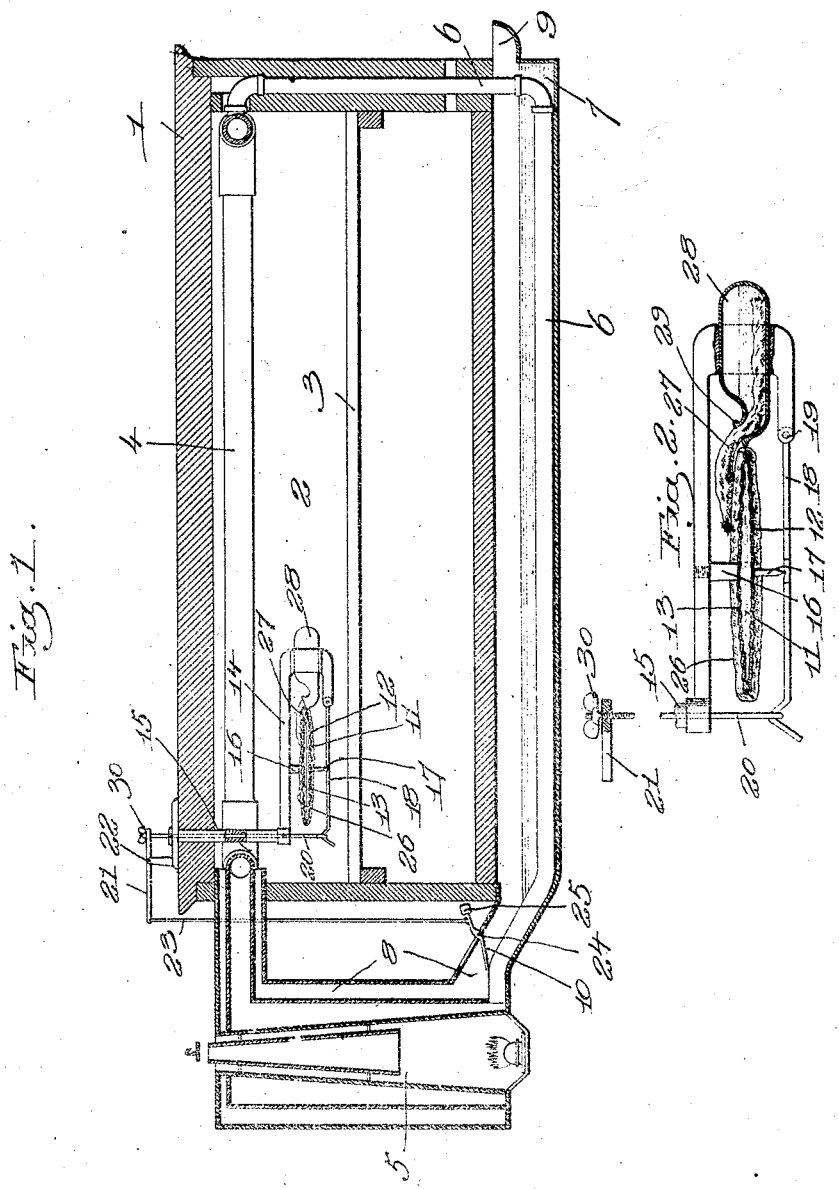

UNITED STATES PATENT OFFICE.

WILBUR E. MAYNARD, OF NORTHAMPTON, MASSACHUSETTS.

HUMIDITY-REGULATOR FOR INCUBATING APPARATUS.

1,009,430.  Specification of Letters Patent.  Patented Nov. 21, 1911.

Application filed June 8, 1911. Serial No. 631,924.

*To all whom it may concern:*

Be it known that I, WILBUR E. MAYNARD, a citizen of the United States, residing at Northampton, county of Hampshire, State of Massachusetts, have invented an Improvement in Humidity-Regulators for Incubating Apparatus, of which the following description, in connection with the accompanying drawing, is a specification, like characters on the drawing representing like parts.

This invention relates to a humidity regulator adapted for use in connection with a chamber having a constant temperature therein and arranged to maintain the humidity in said chamber at a predetermined point.

My device is especially useful in connection with incubating apparatus, for it is desirable that the humidity of the air in the incubating chamber should remain at a substantially constant point in order to produce the best results. I would state, however, that my apparatus can be used in other locations where it is desirable that the humidity should remain at a constant point in a chamber having a constant temperature.

In my Patent No. 981,097, January 10, 1911, I have illustrated an incubating apparatus provided with means to deliver moist air to the incubating chamber and also provided with a hygroscopically-governed controlling device to automatically control the quantity of moisture in the heated air supplied to said chamber. The particular device shown in said patent for accomplishing this regulation of the humidity comprises a valve controlling the admission of the moist air to the incubating chamber and a plurality of cords within the chamber which are connected to the valve and which by their expansion and contraction operate the valve, said cords contracting when the humidity increases and expanding when the humidity decreases. In my present invention I have provided a simple device which is adapted to take the place of the expanding and contracting cords mentioned in my patent and which will control the valve thereby to regulate the amount of moist air admitted to the chamber. I wish to repeat, however, at this point that my improvement is not necessarily limited to its use in connection with an incubator, but is capable of use in other relations.

In the drawings I have shown the device as it would be used in connection with an incubator, and Figure 1 is a vertical sectional view through an incubating apparatus having my improvement applied thereto; Fig. 2 is an enlarged sectional view of the hygroscopic valve-controlling device.

In the drawings 1 indicates an incubator having a compartment 2 in which is received an egg shelf or egg tray 3 on which the eggs are placed. The egg-receiving compartment 2 is shown as heated by heating pipes 4 which extend throughout the compartment and contain some heating fluid, such as hot water, the latter being kept at the proper temperature by an exterior heater 5. The heating pipes 4 lead to a return 6 which passes through a vaporizing tank 7 below the compartment 2 which is partially filled with water so that the heat in the return pipe will vaporize the water in the vaporizing tank. The vaporizing tank has connected thereto a conduit 8 which leads into the chamber 2 and is provided with an air inlet opening 9 so that a current of moist air will be established over th body of water in the tank 9 through the conduit 8 to the compartment 2. These constructional features are all fully set forth in my Patent No. 981,097, and, therefore, further reference thereto is not necessary as the operation of these parts will be readily understood by referring to the patent.

The conduit 8 is provided with a valve 10 which controls the supply of moist air therethrough and this valve is operated and controlled by the hygroscopic valve-controller which will now be described.

My improved hygroscopic valve-controller comprises a sealed expansible and contractible chamber containing an expansible fluid, connections whereby the expansion of said chamber will open the valve while the contraction of said chamber will close the valve, a jacket of absorbent material overlying one side of the chamber, and means to keep said jacket moist.

In the drawings the expansible and contractible chamber is shown at 11 and may be made in any suitable way and may have any suitable construction. One convenient way of making this chamber is to construct it in the form of two disks 12 and 13 which are connected at their peripheries to make a fluid-tight chamber, but which are so constructed that they can move toward or from each other to provide the expansion and contraction of the chamber. The disk 13 is shown as rigidly sustained by a frame 14 which is fixedly carried by the incubator 1. This frame is in the form of an arm extended from a tubular post 15 which is secured to the top of the incubator 1 and depends therefrom into the compartment 2. The disk 13 has rigid therewith a stud 16 which is screwed or otherwise secured to the frame or arm 14, thus fixedly securing the chamber 11 to the frame. The disk 12 has fixed thereto a projection 17 which bears against a lever 18 that is pivoted to the frame 14 at 19. The free end of the lever is loosely connected to a rod 20 which extends up through the post 15 and which is connected at its upper end to a lever 21 that is pivoted to some suitable fixed support, as at 22. The lever 21 is connected by a link or other connection 23 with the valve 10, the latter being pivotally mounted at 24 and provided with a counterweight 25 which tends to open the valve.

The chamber 11 is surrounded by a jacket 26 of absorbent material which fits the disks 12 and 13 and which is kept moist by some suitable means. One convenient way of keeping this jacket moist is by means of a wick 27 which lies against the jacket and which leads to a compartment containing water so that the moisture will be conveyed along the wick by capillary attraction and delivered to the jacket. As herein shown the arm 14 supports a bottle or other vessel 28 having an open neck or mouth 29 through which the wick is led, said vessel being filled or partially filled with water, as clearly seen in Fig. 2. With such a construction the jacket 26 will be kept moist, as will be obvious.

In the operation of the device the chamber 11 is filled with some suitable expansible fluid, such, for instance, as alcohol or ether, so that said chamber will expand more or less and the disks 12 and 13 will be separated a greater or less distance depending on the temperature of the expansible fluid. The jacket 26 is kept moist as above described and the vaporization of the moisture therein will tend to keep the liquid in the chamber 11 at a somewhat less temperature than that of the air in the compartment 2. The rate at which the moisture in the jacket 26 is evaporated depends upon the degree of humidity in the compartment 2, and the temperature, and consequently the volume, of the fluid in the chamber 11 will vary as the rate of evaporation of the moisture in the jacket 26 varies. When the air in the compartment 2 begins to dry out there will be a more rapid evaporation of the moisture in the jacket 26 which will result in cooling the liquid in the chamber 11 and thereby allowing said chamber to contract. As the chamber contracts the disk 12 will move upwardly and the weight 25 will serve to open the valve 10 thereby admitting moist air through the conduit 8 into the chamber 2. As the humidity increases the rate of evaporation of the moisture in the jacket 26 will decrease, and the temperature of the liquid in the chamber 11 will correspondingly increase, thus causing the chamber to expand and the disk 12 to move downwardly. Such movement will operate through the arm 18 and connections 20 and 23 to close the valve 10 and thus shut off the supply of the moist air. The delivery of the moist air to the compartment 2 is thus regulated automatically by the hygroscopic valve-controlling device above referred to.

I have found from experiments that this device is very accurate and sensitive and will keep the humidity in the compartment 2 at a substantially uniform degree.

I have provided an adjustable connection between the rod 20 and the lever 21 which connection permits me to adjust the device for different uniform temperatures in the compartment 2. This adjustable connection may be provided for in a variety of ways, but a convenient construction is that shown in the drawings wherein the upper end of the rod 20 is screw-threaded and extends through the end of the lever 21 and is provided with an adjusting nut 30. By thus lengthening or shortening the connection 20 the position of the valve may be adjusted to correspond to any desired temperature in the compartment 2.

While I have illustrated my invention as it might be applied to an incubating apparatus, I desire to state that it is equally applicable for use in other relations where it is desired to maintain a fixed degree of humidity in the compartment having a uniform temperature, and therefore I do not wish to be limited to the application of the invention shown or to the constructional details illustrated.

Having fully described my invention what I claim as new and desire to secure by Letters Patent is:—

1. In a humidity regulator, the combination with a compartment maintained at a constant temperature, of a conduit leading to said compartment through which moist air is admitted thereto, a valve in the conduit, and a hygroscopic valve controller situated within said compartment and comprising an expansible chamber containing an expansible fluid, means to open the valve when the chamber contracts and to close the valve when the chamber expands, a jacket of absorbent material overlying one side of the chamber, and means to keep the jacket moist.

2. In a humidity regulator, the combination with a compartment maintained at a constant temperature, of means to deliver moisture to said compartment, and a hygroscopic controller situated within the compartment for regulating the amount of moisture delivered, said controller comprising an expansible chamber containing expansible fluid, a jacket of absorbent material enveloping the chamber, and means to keep the jacket moist.

3. In a humidity regulator, the combination with a compartment maintained at a constant temperature, of a conduit leading to said compartment to which moist air is delivered, a valve controlling said conduit, and a hygroscopic valve controller situated within said compartment and comprising an expansible chamber filled with expansible fluid and provided with a fixed and a movable connection between the movable side of said chamber and the valve whereby the valve is moved by movement of said side, a jacket of absorbent material enveloping said chamber, and means to keep said jacket moist.

In testimony whereof, I have signed my name to this specification, in the presence of two subscribing witnesses.

WILBUR E. MAYNARD.

Witnesses:
 LOUIS C. SMITH,
 THOMAS J. DRUMMOND.